United States Patent [19]

Simmons et al.

[11] 4,089,595
[45] May 16, 1978

[54] MOUNTING ARRANGEMENT FOR RIGHT ANGLE CASSEGRANIAN TELESCOPE REFLECTOR SYSTEM

[75] Inventors: Gerald P. Simmons, Washington; Hiram A. Brubaker, Peoria; William E. Streight, East Peoria; Robert W. Brown, Chillicothe, all of Ill.

[73] Assignee: Caterpillar Tractor Co., Peoria, Ill.

[21] Appl. No.: 716,846

[22] Filed: Aug. 23, 1976

[51] Int. Cl.² ............................................. G02B 5/10
[52] U.S. Cl. ..................................... 350/294; 350/299
[58] Field of Search ............... 350/247, 299, 252, 296, 350/294

[56] References Cited

U.S. PATENT DOCUMENTS

| | | | |
|---|---|---|---|
| 2,861,484 | 11/1958 | Rance | 350/247 |
| 3,713,725 | 11/1973 | Uesugi | 350/247 |
| 3,907,408 | 9/1975 | Engel | 350/294 |

*Primary Examiner*—Jon W. Henry
*Attorney, Agent, or Firm*—Phillips, Moore, Weissenberger, Lempio & Majestic

[57] ABSTRACT

An optical system for directing a beam of corpuscular energy such as a laser beam is provided and includes a fixed mirror mounted at 45° to the longitudinal axis of the beam so as to deflect the beam substantially 90° to impinge upon a fixed concave mirror located at the forward end of the optical system housing. The beam is then reflected and converged back to a convex mirror mounted on a cylindrical mount within a centrally disposed bore in the 45° mirror and then forwardly through a similar aperture in the concave mirror where it passes out through the forward end of the housing to a point of focus on, for example, a workpiece. The convex mirror mounting arrangement provides for three degrees of freedom whereby focusing and adjustment of the optical system is accomplished by merely adjusting one of the three mirrors while holding two of the mirrors fixed. Means for adjustment includes a pair of sleeves around the cylindrical convex mirror mount which are eccentric, thereby providing adjustment of the beam in the Y and Z axis directions by relatively rotating the sleeves. Adjustment in the X axial direction is accomplished by means of adding shims between the radially outwardly directed flange on the rear end of the cylindrical mirror mount and the sleeves. The invention also provides for a method of aligning such an optical system both internally and with an external source of corpuscular energy.

5 Claims, 13 Drawing Figures

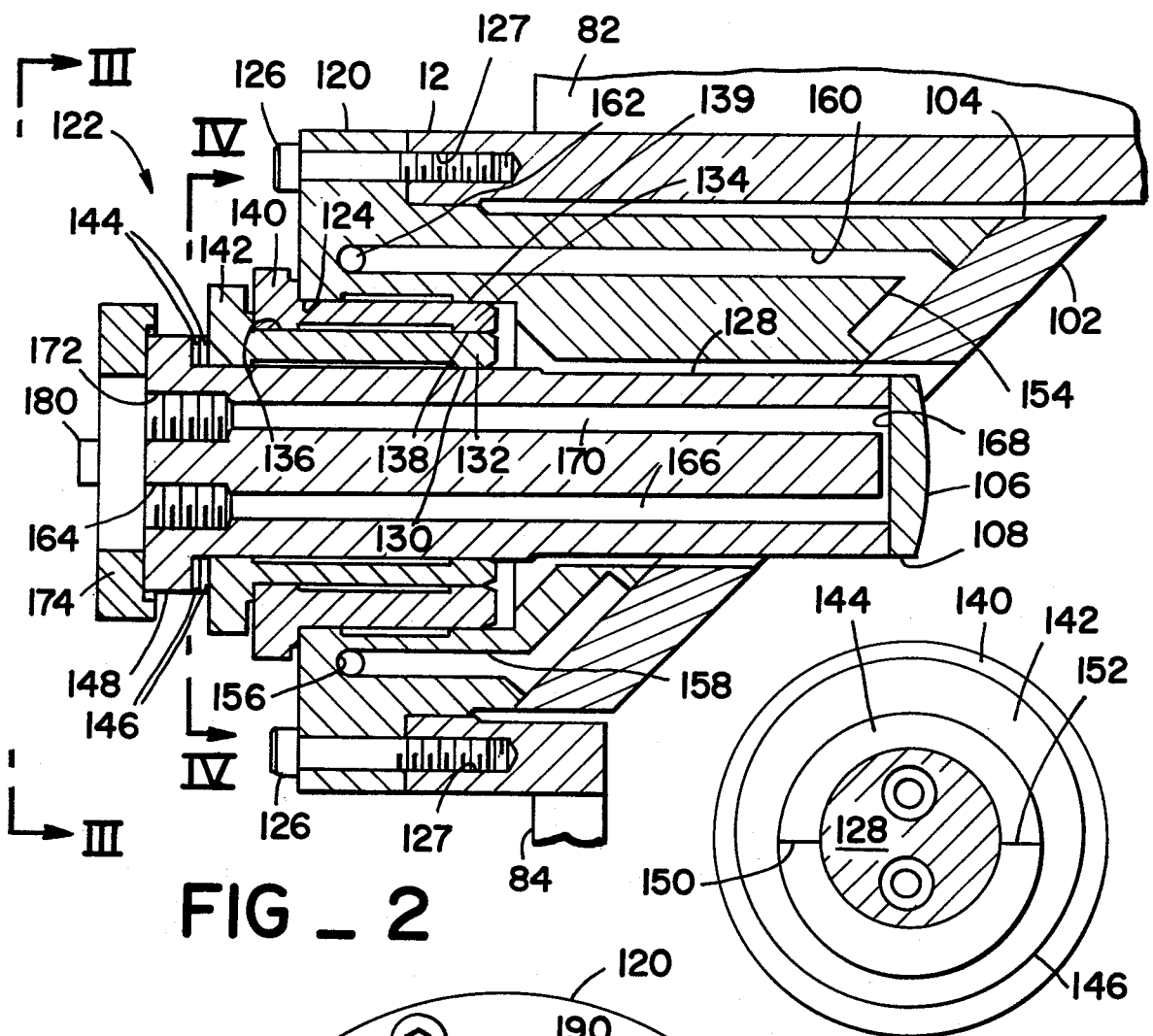
FIG_2
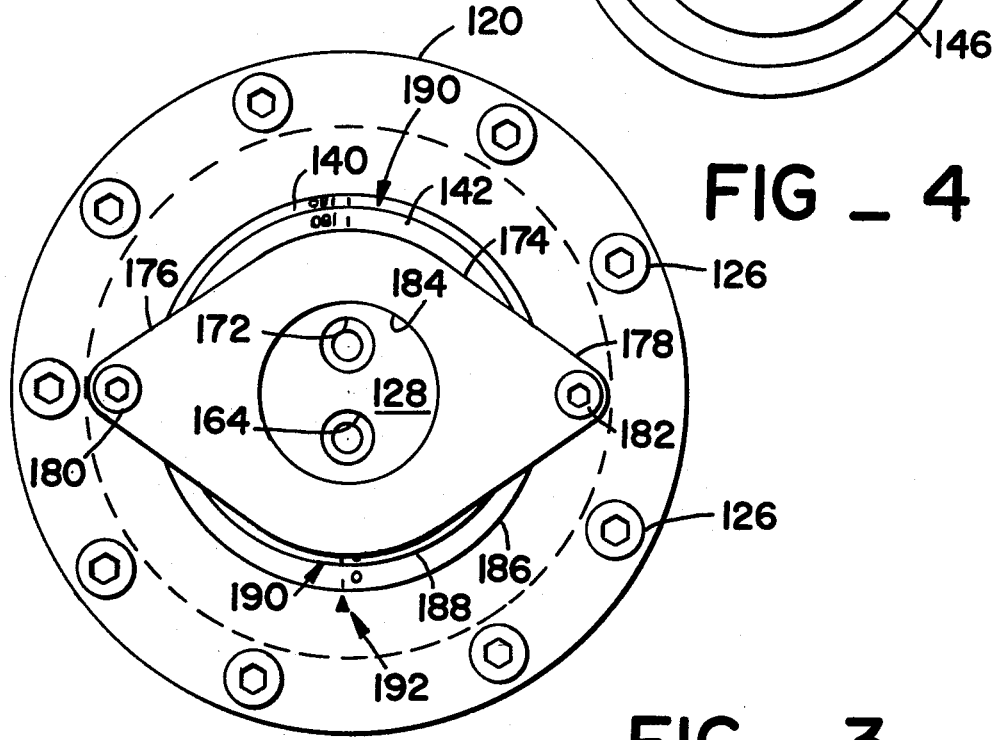
FIG_4
FIG_3

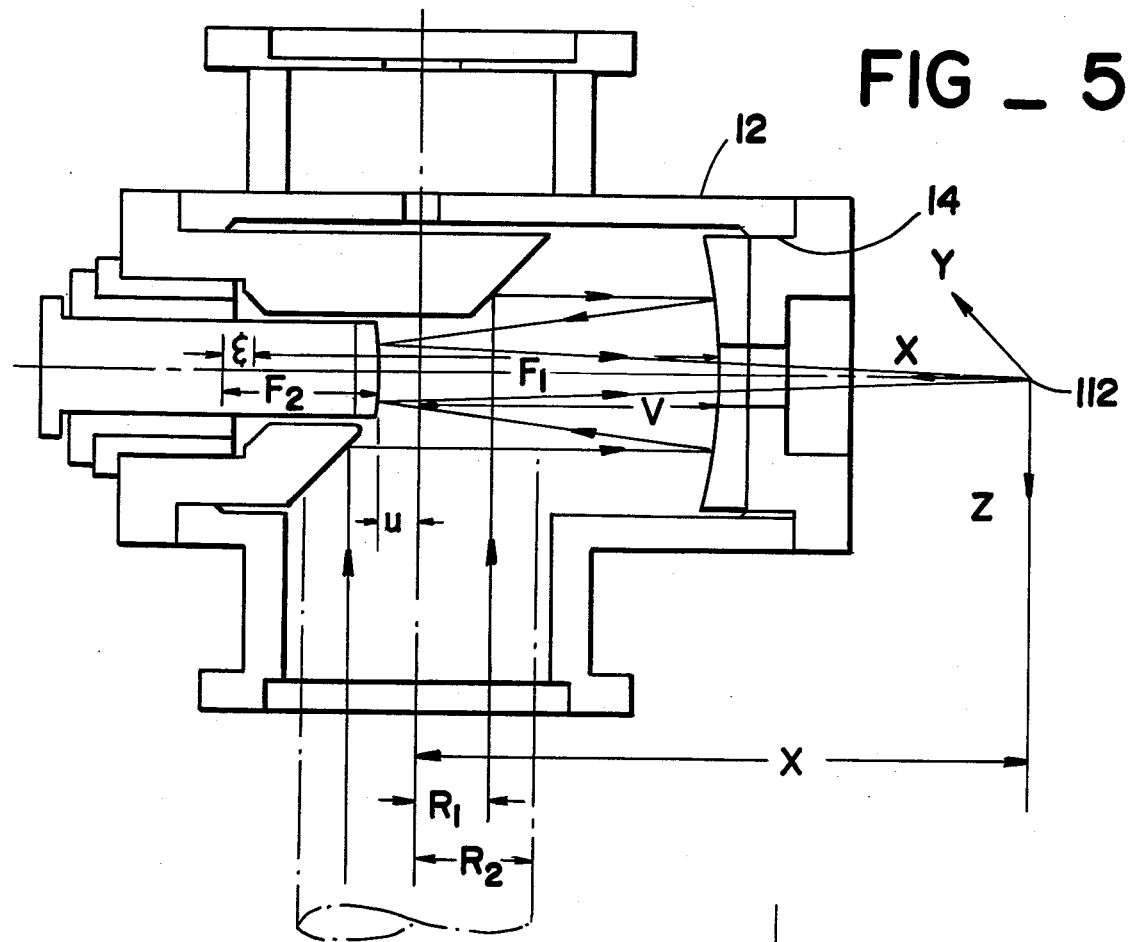
FIG _ 5
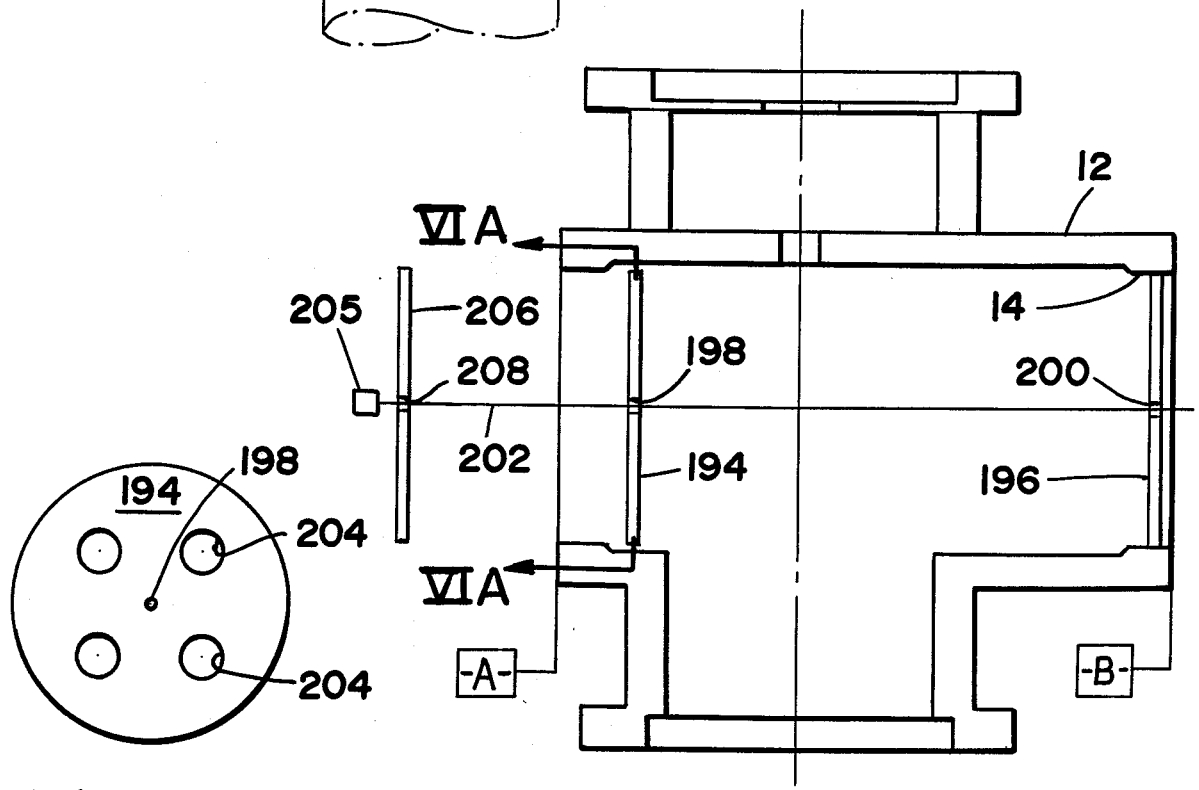
FIG _ 6A  FIG _ 6

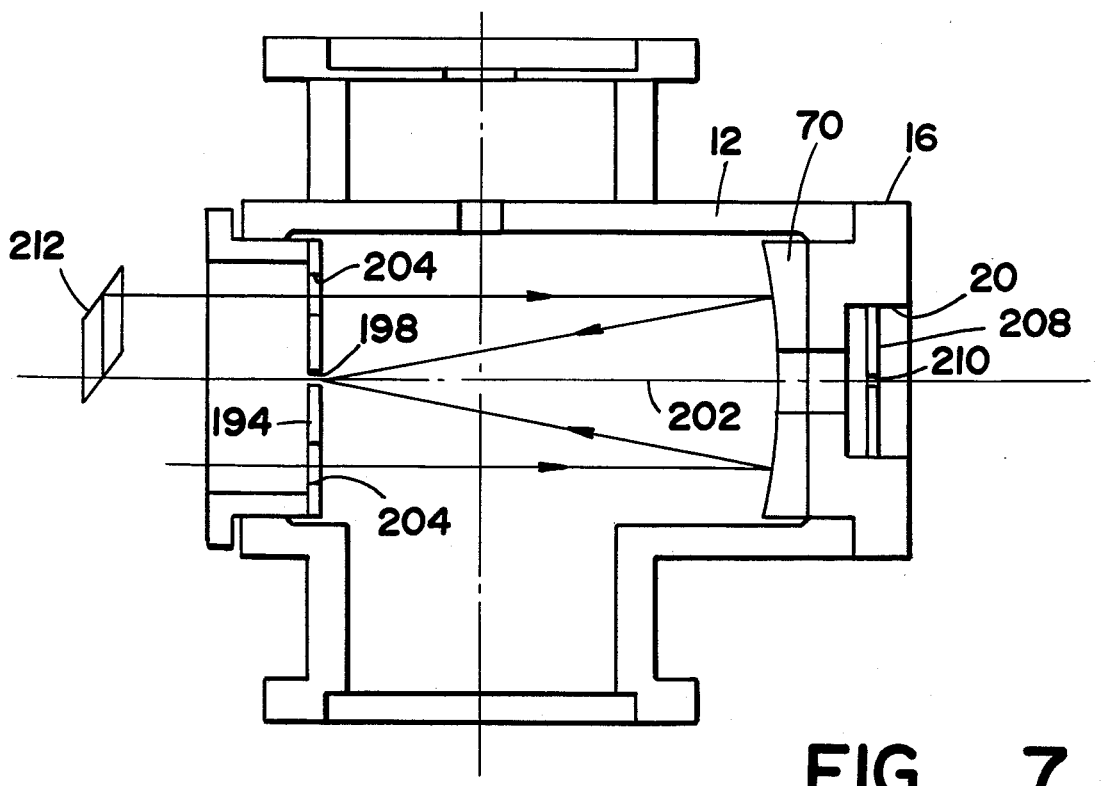
FIG _ 7
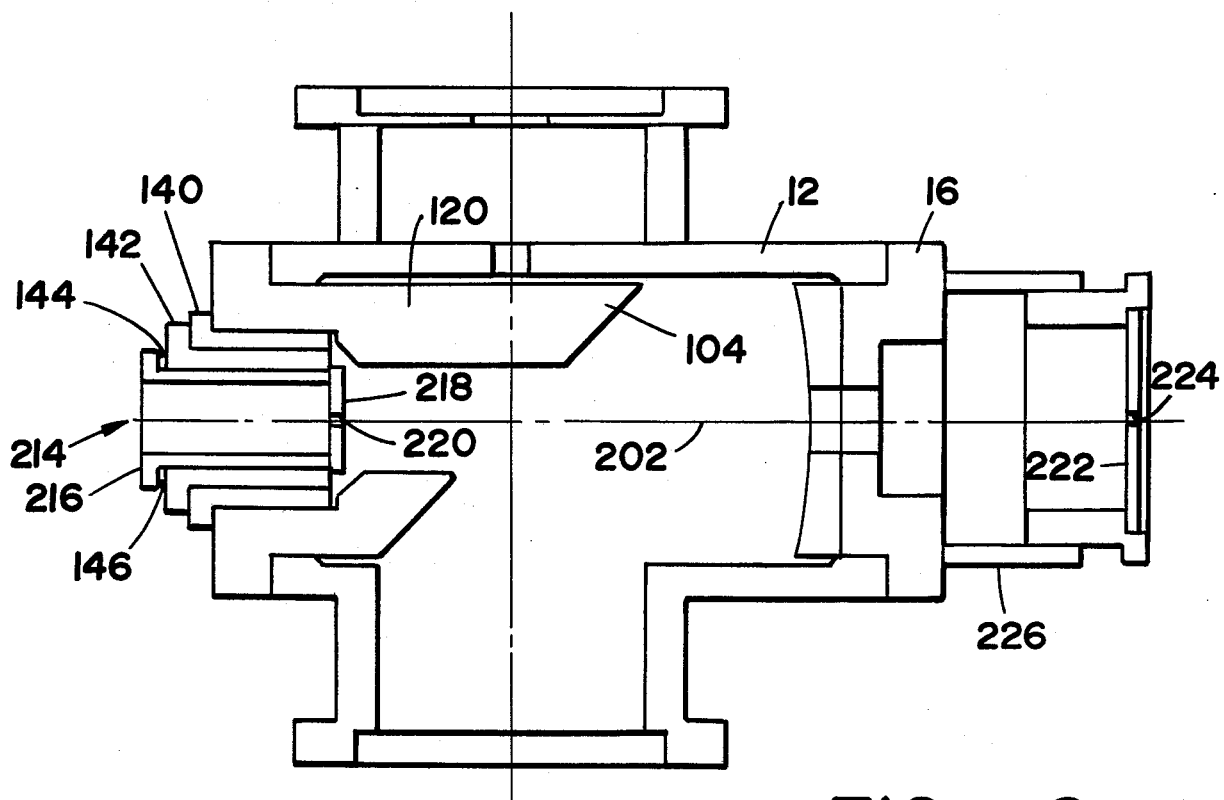
FIG _ 8

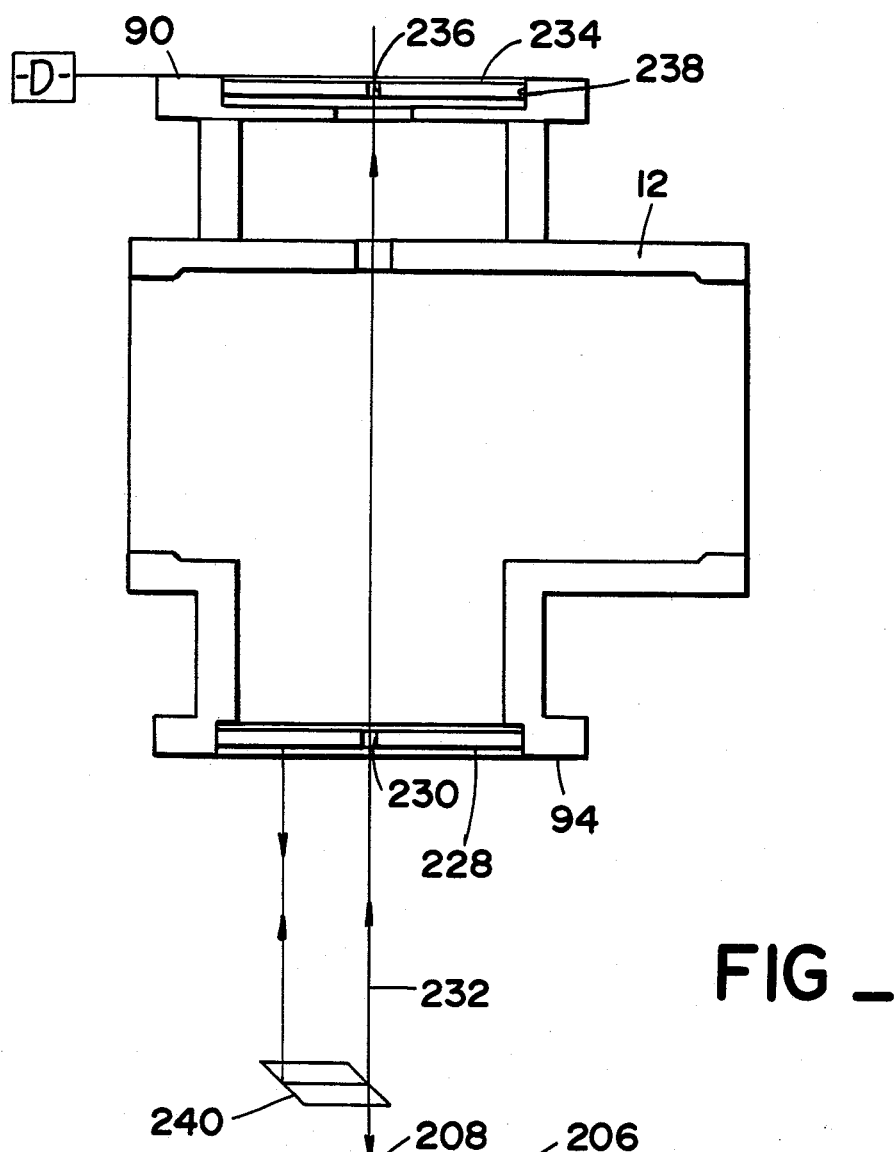
FIG_9
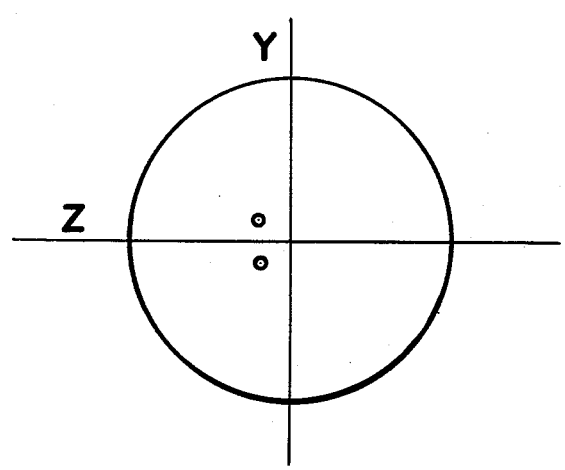
FIG_12

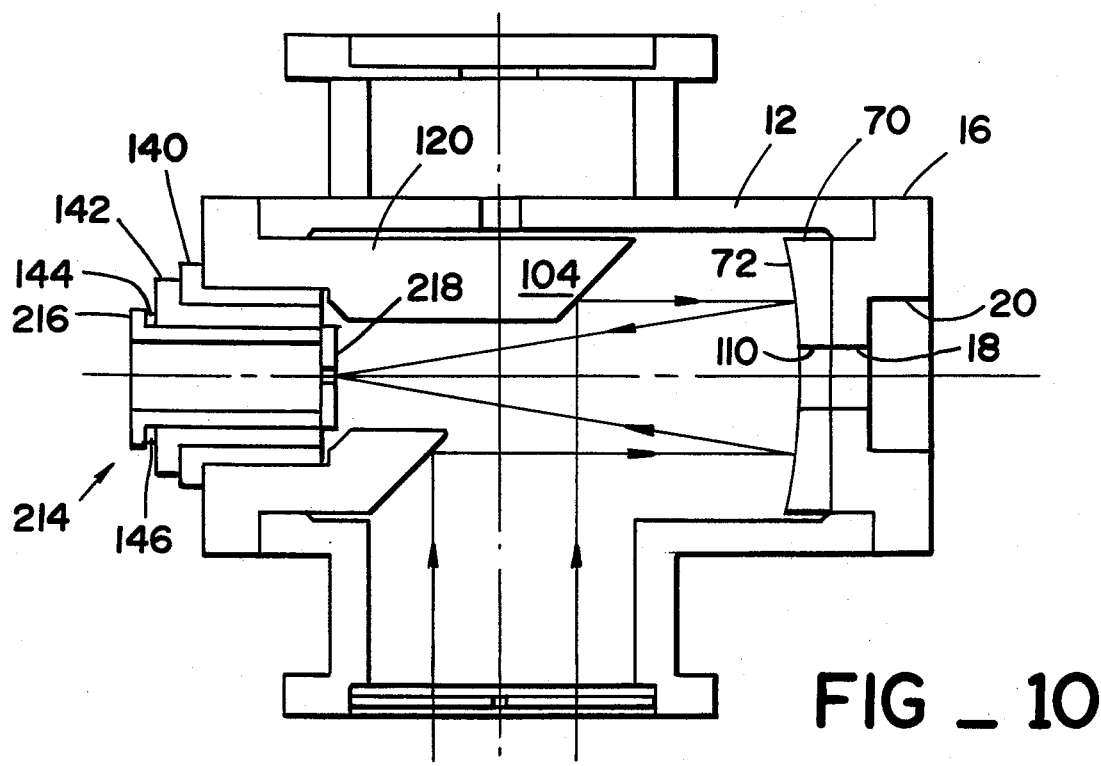
FIG_10
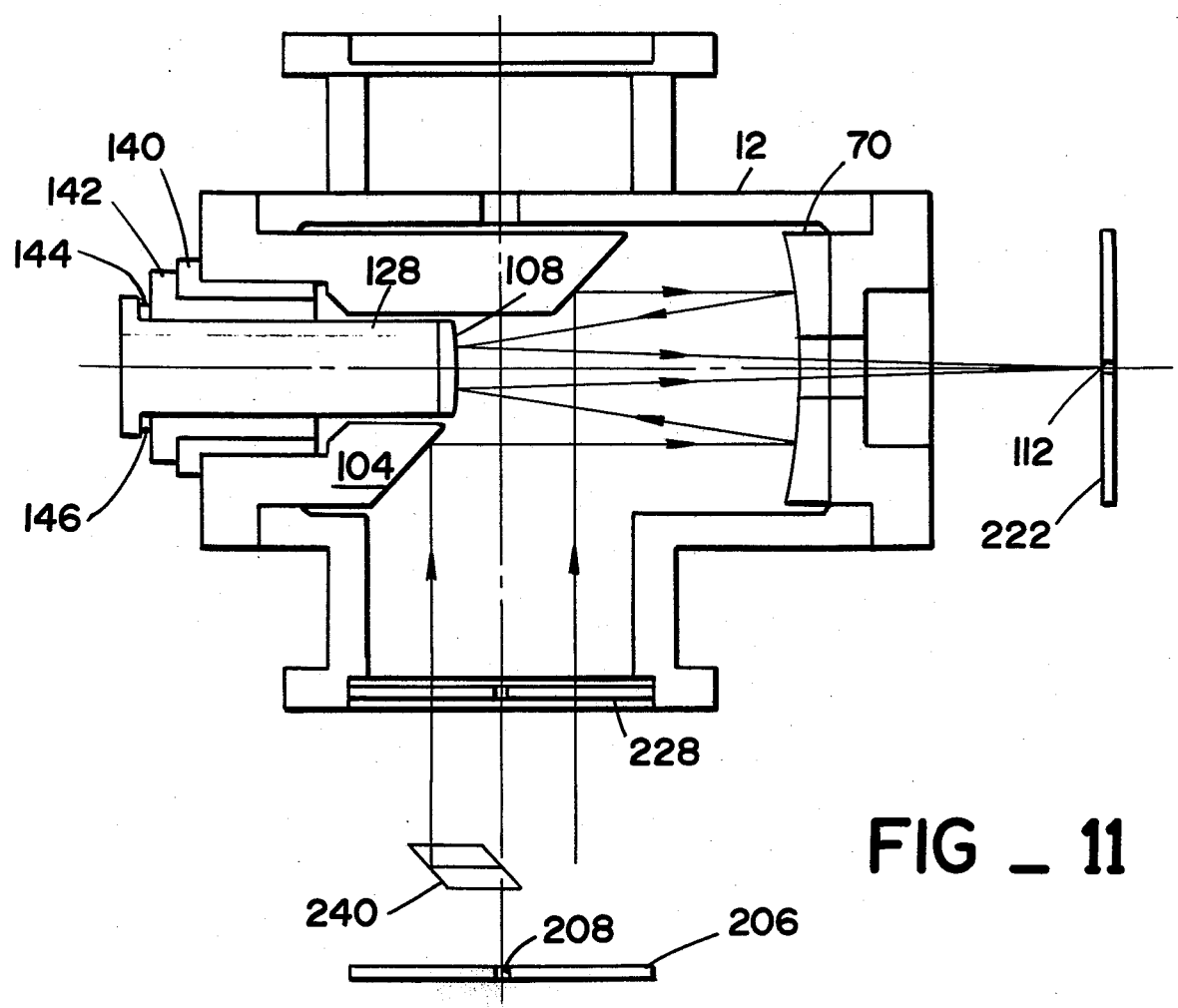
FIG_11

MOUNTING ARRANGEMENT FOR RIGHT ANGLE CASSEGRANIAN TELESCOPE REFLECTOR SYSTEM

BACKGROUND OF THE INVENTION

This invention relates to an optical system for use with a source of corpuscular energy such as a laser. More particularly, this invention relates to an improved method and apparatus for aligning the mirrors of a laser optical system.

The usage of lasers in recent times has been extended to high power industrial applications. In these applications the lasers are used for cutting and welding of heavy workpieces by means of converging and focusing a high powered laser beam from a supply source onto the workpiece surface. The converging and focusing is accomplished by means of an optical system using mirrors. One such optical system is shown in U.S. Pat. No. 3,907,408 to Engel, assigned to the assignee hereof. With that reflective optical system, three mirrors are used to change the direction of a supply beam from a source of corpuscular energy such as a laser source. The beam is reflected off a 45° angle planar mirrow within an optical system housing forwardly 90° from the beam axis to impinge upon a concave mirror adjustably mounted in the forward end of the housing. From here, the beam is reflected back along the housing axis and converged to impinge upon a centrally disposed mirror, which is a convex mirror mounted within a bore in the 45° mirror. The beam is then reflected forward through an aperture in the concave mirror and converged to a point of focus exterior to the mirror housing. With this system, all mirrors are adjustable for purposes of alignment.

This adjustability of all three mirrors is somewhat disadvantageous since it results in both a complexity of parts and therefore increased cost, and also complexity in alignment procedures.

SUMMARY AND OBJECTS OF THE INVENTION

It is therefore the primary object of this invention to provide a mirror optical system that avoids the limitations of prior art optical systems.

It is a further object of this invention to provide such a mirror optical system having a plurality of mirrors wherein all but one of the mirrors is fixed and all adjustability is achieved by means of movement of a single mirror.

It is a further object of this invention to provide such an optical system wherein the adjustable mirror has three degrees of freedom so as to precisely focus the beam of corpuscular energy passing through the system.

It is a further object of this invention to provide such an optical system allowing for precise determination of beam focus.

It is a further object of this invention to provide a method of aligning the optical system with an external laser source, as well as internally aligning the plurality of mirrors within the optical system.

Broadly stated, the invention provides a method and apparatus including an optical system providing a housing containing a plurality of mirrors for reflecting a beam of corpuscular energy substantially 90° from the direction of travel, as well as converging such beam to a point of focus. The housing includes an aperture in the side thereof for admitting a beam such as a laser beam therethrough to impinge upon a mirror oriented 45° to the beam axis. The first 45° mirror is fixed against movement and reflects the beam forwardly in the housing so as to impinge upon the concave mirror which is also fixed. The beam is then reflected and converged back to impinge upon a third, convex mirror mounted on a cylindrical adjustable mirror mount within a bore centrally disposed in the 45° mirror. The beam is then reflected forwardly through an aperture similarly centrally disposed in the concave mirror where it passes outwardly of the housing to a point of focus on, for example, a workpiece. The third, convex mirror is adjustable in three degrees of freedom by means of a mirror mounting arrangement whereby the beam focus may be precisely determined. The mirror mounting arrangement consists of a pair of sleeves having eccentricities therebetween, whereby relative rotation of one sleeve with respect to the other causes movement of the centrally received third mirror in both the Y and Z directions. Adjustability in the X direction is accomplished by means of inserting shims between radially outwardly extending flanges on the cylindrical mirror mount and the sleeves. The invention also provides a method for aligning the external laser beam with the optical system as well as internal alignment of the mirrors.

Further and other objects and advantages of this invention will become more readily apparent from a review of the accompanying drawings and following specification.

BRIEF DESCRIPTION OF THE DRAWINGS

FIG. 2 is an enlarged view of a portion of the optical system of FIG. 1 showing details of the means for adjusting the beam;

FIG. 3 is a view taken along the lines III—III in FIG. 2 showing further details of the adjustment means;

FIG. 4 is a cross-sectional view taken along lines IV—IV in FIG. 2, showing details of the mirror adjustment means and in particular the shims for X axial adjustment;

FIG. 5 is a semi-schematic sectional elevational view of the optical system in the X-Z plane illustrating optical parameters;

FIGS. 6; 6A through 11 are semi-schematic views similar to FIG. 5 illustrating steps in alignment of the optical system; and, FIG. 12 is a graphical view of the adjustability of the optical system in the Y-Z plane.

DETAILED DESCRIPTION

Figure 1:
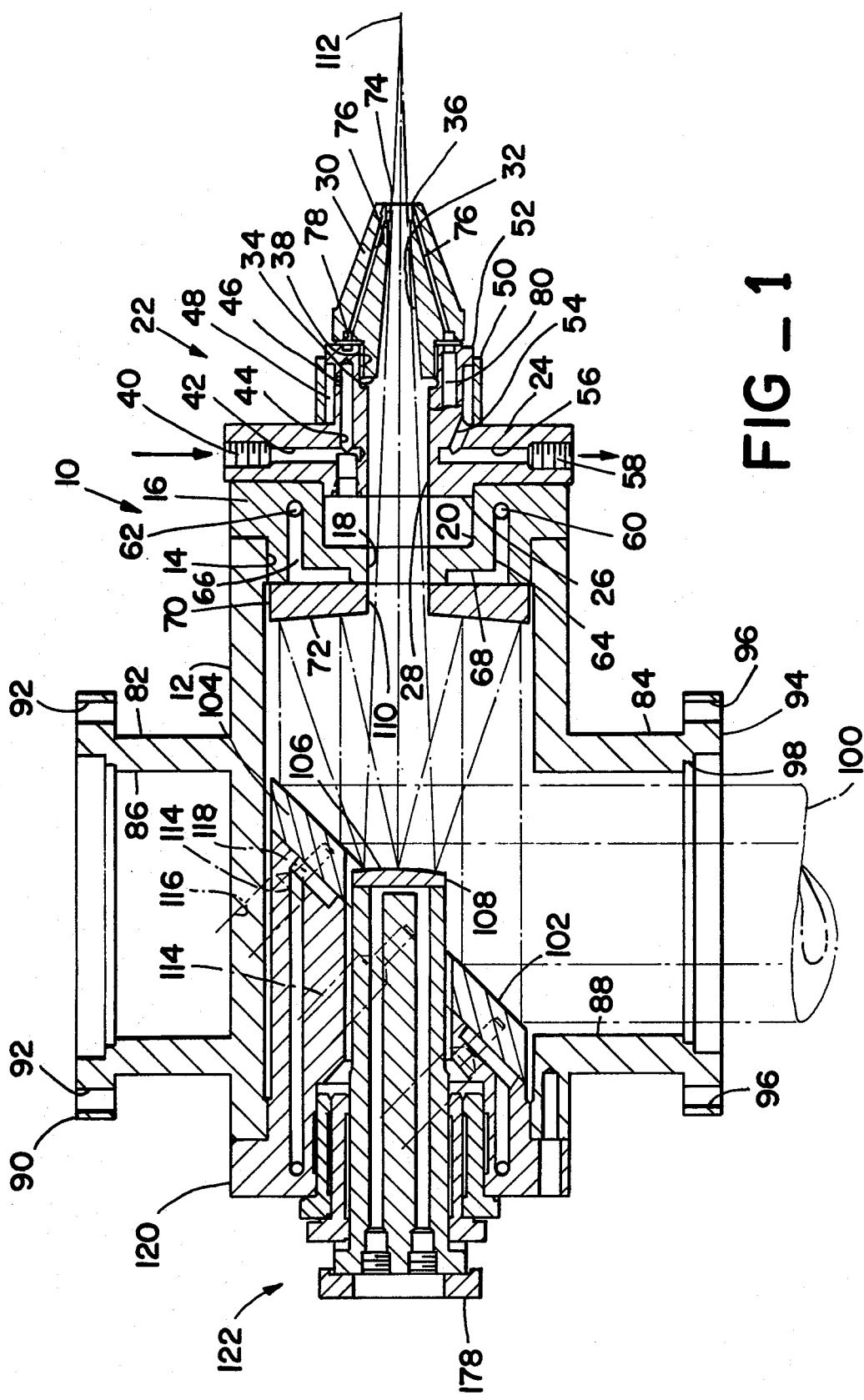
FIG. 1 is a sectional elevational view of the optical system.

FIG. 1 shows a mirror optical system in cross-section incorporating the principles of the present invention and is generally indicated by numeral 10. The optical system described includes a generally cylindrical main support body or housing 12 having an internal axial bore 14 therein. A generally cylindrical forward end wall 16 has a centrally disposed bore 18 therein for passing a beam of corpuscular energy such as a laser beam as will be more fully described hereinafter.

A stepped bore 20 is included within the forward end wall. Mounted forward of the forward end wall is a nozzle assembly shown generally at 22. The nozzle assembly comprises an annular nozzle mount 24 having a stepped and cylindrical portion 26 fitted within bore 20. An internal bore 28 within the nozzle mount is dimensioned to correspond with similarly centrally disposed bore 18 in forward end wall 16. A frustoconical nozzle 30 having a frustoconical internal bore 32 and defining inlet and outlet openings 34, 36, respectively, is mounted on nozzle mount 24. Mounting is accomplished by means of a threaded interconnection at 38. Cooling water is allowed to circulate within the nozzle mount by entering the threaded inlet 40 and thence through passages 42,44,46 to an annular chamber 48 defined by an annular ring 50 fixed over a cylindrical stepped projection 52 of the nozzle mount. Water circulating around the chamber exits through passages 54,56 and thence through threaded outlet 58. Appropriate lines may be connected to inlet 40 and outlet 58 and thence to means for providing cooling water flow.

Similarly, inlets and outlets (not shown) leading to passages 60,62 and from passages 64,66 in front end wall 16, respectively, serve to circulate water around annular cooling channel 68 in contact with a concave mirror 70 which may be a copper material having a reflective surface 72 thereon.

Turning to the nozzle 30, a protective gas, such as an inert shielding gas, is admitted to the outlet 36 by means of an annular diffuser 74 contained within the outlet. Passages 76 leading from an annular manifold 78 serve to transport the gases from an inlet passage 80 connected to a source of supply (not shown).

Mounted on the sides of the housing 12 are a pair of similar cylindrical bodies 82,84 having hollow interior and cylindrical openings 86,88, respectively. A mounting flange 90 having a bolt hole ring containing a plurality of bolt holes 92 is fixed to the upper end of cylindrical body 82. In similar fashion, a mounting ring 94 having a similar bolt hole ring containing a plurality of bolt holes 96 is mounted on the end of cylindrical body 84. The last named flange forms a supply laser beam entry post 98.

A collimated annular beam of corpuscular energy such as a laser beam 100 enters through the entry port and impinges upon reflective surface 102 of a first mirror 104 mounted at a 45° angle to the beam axis. The first mirror causes the beam to be directed at a 90° angle to the beam axis forwardly in the housing to impinge upon reflective surface 72 of second, concave mirror 70. The beam is reflected and converged in a rearward direction in the housing, where it impinges upon reflective surface 106 of a third, convex mirror 108.

The beam is then reflected forwardly along the axis of the cylindrical housing 12 through an opening or bore 110 centrally disposed in mirror 70 and outwardly of the housing to a point of focus 112 where it may do useful work on, for example, a workpiece.

Both the first and second mirrors are fixed against movement such as by bonding, or in the case of the first mirror, by a plurality of screws 114 contained within accommodating bores 116,118 in the rear end wall or mirror mount. All of the mirrors may be of, for example, a copper material with a polished reflective surface. By fixing the first and second mirrors, the adjustment of the focus of the beam is accomplished by adjustment of the third mirror 108 in triaxial directions by means of an adjustment mechanism shown generally at 122 as will now be described.

As shown in FIG. 2, the adjustment mechanism or means is contained within a stepped bore centrally disposed within rear mirror mount 120. The mount 120 is conveniently fixed to housing 12 by means of a plurality of bolts 126 threaded into accommodating bore 127 in the housing as shown. The third or convex mirror 108 is mounted to the forward end of a cylindrical adjustable mirror mount 128 by bonding or other suitable means. The mirror mount 128 is slidably fitted within an interior bore 130 in the first of a pair of cylindrical sleeves 132, 134. The outer surface 136, non-concentric with interior bore 130, fits within an accommodating inner bore 138 of outer sleeve 134. The outer sleeve is thereby eccentrically mounted with respect to interior bore 130. Relative rotation of the two sleeves will cause the mirror mount 128 and mirror 108 mounted thereon to move in two degrees of freedom whereby Y and Z axis adjustment of the mirror can be made, as will be more fully described hereinafter. The outer sleeve 134 has a cylindrical outer surface 139 slidably contained within accommodating bore 124. Relative rotation is accomplished easily by means of outer and inner sleeve flanges 140,142, respectively, which may have knurling thereon to facilitate hand manipulation. The flanges, which are radially extending, conveniently abut each other as shown.

X axis movement of mirror 108 is accomplished by means of manual movement of mount 128 in the axial direction. A plurality of spacers or shims 144,146 may be inserted between radially extending flange 148 of mount 128 and flange 142 of inner sleeve 132. In this manner, X, Y and Z axial adjustment of the third mirror 108 may be accomplished. As seen in FIG. 4, the spacers or shims 144,146 are generally C-shaped so that they may be inserted over the mount 128 from opposite sides so as to abut at their points of contact 150,152. Returning to FIG. 2, the mirrors are cooled in similar fashion to the concave mirror. The 45° mirror 104 has an annular passage 154 therebehind. Inlet cooling passages 156,158 for a source of coolant (not shown) and supply coolant flow which exits through outlet cooling passages 160,162.

Similarly, threaded inlet 164 in rear of mount 128 may be interconnected with a source of coolant fluid for transmission of coolant through a passage 166 to a chamber 168 at the rear of mirror 108 and thence through anoutlet passage 170 to a threaded outlet 172 similar to inlet 164.

As best seen in FIG. 3, a locking mechanism is provided in the form of a locking plate 174 having a pair of laterally extending arms 176,178 through which pass a pair of bolts 180,182 which are threadedly secured within mirror mount 120 after the proper adjustment has been made. An opening 184 centrally disposed within locking plate 174 permits flexible tubing (not shown) to be attached to the inlet and outlet 164,172, respectively.

Knurling exterior surfaces 186,188 of flanges 140,142 facilitate the relative rotation thereof. Small indicia in the form of degree lines and appropriate degree numbers shown generally at 190 may be used to give a visual indication of eccentricity with respect to a base indicia 192 on mount 120, as shown.

Turning now to FIG. 5, there is shown a semi-schematic representation of the optical system. A mathematical anaylsis of the mirror system is like that shown in U.S. Pat. No. 3,907,408 to Engel, the disclosure of which is expressly herein incorporated by reference. In brief summary, it was there stated that the focal point (X) was:

$$X = \frac{F_2^2}{\epsilon} - (F_1 - V) - \epsilon$$

where
X = distance of focal point from optic axis,
$F_2$ = focal length of convex mirror,
$F_1$ = focal length of concave mirror,
$\epsilon$ = difference between the foci of the concave and convex mirrors, and
V = distance from the optic axis to the concave mirror.

The distance between the foci is as follows:

$$\epsilon = (F_2 + F_1) + u$$

wherein
$F_2$, V, and $F_1$ are defined above and
u = distance from optic axis to the convex mirror.

The alignment of the optical system will now be described with reference to FIGS. 6 through 11. In brief summary, the alignment includes the internal alignment of the three mirrors (45°, concave and convex) and the external alignment of the optical system with the external laser beam source. The external laser may be visible Helium-Neon laser which has been previously aligned with a high power $CO_2$ laser having an invisible laser beam. For purposes of internal laser alignment, a 5 milliwatt Helium-Neon laser may be used which is visible to the naked eye. The steps may be summarized as follows:

1. Alignment of the laser beam along the housing axis.
2. Alignment of the concave mirror.
3. Alignment of the laser along the optic axis.
4. Alignment of the 45° mirror.
5. Alignment of the convex mirror.
6. Alignment of the optical system with the external laser source.

The following is a more detailed description of each of the above enumerated steps.

1. Alignment of the laser beam along the housing axis

Having reference to FIG. 6, after the optical system housing 12 is secured to an optical bench (not shown) two Lucite plates 194,196 having a circular configuration and denominated number 1 and number 2 respectively for sake of convenience are installed as shown within the internal bore 14 of the housing. These plates have centrally disposed bores 198,200 therein for passage of and aligning a laser beam 202. As may be seen in FIG. 6A, plate 194 may conveniently have a plurality of additional ports 204. Laser beam 202 is generated by a laser beam source 205 and passes through a further Lucite plate 206 which for the sake of convenience may be called Lucite plate or piece No. 3. This plate has a centrally disposed aperture or bore 208. In like manner, bores 198 and 200 are in Lucite plate Nos. 1 and 2. Plates Nos. 1 and 2 are located off datums A and B which are perpendicular to the central axis of the housing. As shown, Lucite piece No. 3 is placed between the laser source 205 and the housing 12.

The laser 205 is positioned so that beam 202 passes through bores 198,200 which are substantially the same diameter as the diameter of beam 202. The laser 205 and beam 202 are thus aligned with respect to the housing 12.

While Lucite piece No. 1 should have a configuration shown similar to that in FIG. 6A, pieces 2 and 3 should have only the single, centrally disposed aperture or bore at their centers.

2. Alignment of the concave mirror

Turning to FIG. 7, without disturbing the laser/housing alignment fixed in step 1, the concave mirror 70 is placed into position as shown in the forward end wall of the housing 16. As shown in this Figure, a Lucite piece 208 which for sake of convenience may be denominated No. 4, and having a centrally disposed aperture 210, is placed within bore 20 of forward end wall 16. The aperture 210 also has a diameter substantially equal to the beam diameter so that Lucite piece No. 4 may be used to establish the concentricity of the mirror assembly with the housing. It should be removed after concentricity is established.

A rhomboid prism 212 is used to displace the laser beam a distance off the housing axis, for example the 1,1 inches shown. The beam passes through the holes or openings 204 in piece No. 1 and reflects off the concave mirror 70.

Lucite piece No. 1 is shimmed to the principal focus (f) of the concave mirror. If the concave mirror is not properly positioned, the focus may be off axis in a plane perpendicular to the body axis.

If so, the mirror is adjusted until the focal point is at the center 198 of the Lucite piece No. 1.

Next, the 45° mirror mount 120 is placed in position as shown in FIG. 8. A Lucite assembly 214 comprises a hollow cylindrical flange adjustment sleeve 216 and a Lucite piece or plate 218 and having a centrally disposed aperture 220 and denominated Lucite plate No. 8 for sake of convenience in lieu of the convex mirror. With the outer and inner sleeves 140,142, respectively, set at 0, the 45° mirror assembly should be concentric with the optical system body. Any rotation of the assembly should not displace the beam from the center of the Lucite.

Before the laser is moved from this position, a further Lucite piece 222 having a centrally disposed aperture or opening 224 located in a telescoping barrel mount 226 on the forward end wall 16 is moved in an axial direction. The beam 202 should pass through apertures 220 and 224. Movement forwardly and rearwardly along the housing axis should not change the Lucite's concentricity with that axis.

3. ALIGNMENT OF THE LASER ALONG THE OPTIC AXIS

The 45° mirror and mirror mount 120 are removed as best seen in FIG. 9. The laser is repositioned so that the incident beam lies along the optic axis, as shown in this Figure. A polished steel plate 228 with a centrally disposed hole or aperture 230 and conveniently called piece No. 6 is placed in the position shown, whereby the beam 232 passes therethrough after first passing through aperture 208 in Lucite plate 206 (plate No. 3) which is oriented as shown in the Figure. The beam then passes through Lucite piece or plate 234 and called plate No. 7, through an aperture or opening 236 therein. This plate is located in exit port 238 of mounting flange 90 and is positioned at a datum D. The beam 232 is adjusted until it passes through all of pieces 3, 6 and 7.

It should be noted that steel piece 6 must be positioned perpendicular to the optic axis since it will be used to align the optical system with the external $CO_2$ laser at a later time. The beam is displaced off axis by a rhomboid 240 as shown. If the steel plate 228 is perpendicular to the optic axis, the reflected beam will pass back through the hole 208 of Lucite piece 206 from which it emerged.

4. ALIGNMENT OF THE 45° MIRROR

As shown in FIG. 10, the 45° mirror assembly including the Lucite assembly 214 is reinserted in the position in the housing. A rhomboid (not shown) is used to displace the beam 1.1 inches off the optic axis as shown. The beam is then reflected off the 45° mirror 104, then off the concave mirror 70, and thence to the focal point of the concave mirror. With the adjusting barrels 140,142 set at O, Lucite piece No. 8 is shimmed to this focal point. The 45° mirror is then rotated so that the focus is at the center of the Lucite piece No. 8.

If rotation of the 45° mirror does not shift the beam to the center of the Lucite piece, the eccentric barrels 140,142 are rotated until this is accomplished. The position of the barrels respective to the mount 120 is then noted as this will become the centered reference position.

5. ALIGNMENT OF THE CONVEX MIRROR

Lucite assembly 214 is removed and replaced by mirror mount 128 having mirror 107 mounted thereon, as shown in FIG. 11. Using rhomboid 240 again, the beam is again displaced 1.1 inches off the optic axis as shown. The beam is then reflected off the 45° mirror 104, then off the concave mirror 70, and finally off the convex mirror 108 to the system focal point 112 at Lucite piece 222 (plate No. 5).

However, if the system focus and the theoretical focus do not coincide, the convex mirror can be shimmed by means of shims 144 and 146 to adjust the axial position of the focus. The lateral position can be adjusted by rotating the eccentric barrels 140,142 as hereinbefore described. FIG. 12 shows the adjustability of the optical system in the Y–Z plane.

6. ALIGNMENT OF THE OPTICAL SYSTEM WITH THE EXTERNAL LASER SOURCE

The external visible Helium-Neon laser source is first aligned with the $CO_2$ laser. The visible laser beam is then passed through the center of steel piece 228 (plate No. 6). See: FIG. 9.

Using rhomboid 240, this beam is displaced off the beam axis so as to reflect it off the steel surface of piece 228. The optical system housing is then adjusted so that the beam passes back through Lucite piece 206 (plate No. 3) from whence it originated.

The rhomboid is then removed and the beam is checked to see if it still passes through the center of steel piece 228. If not, the housing is further adjusted as set out in the antecedent step.

The antecedent two steps are continually repeated until steel plate No. 6 is concentric and perpendicular to the visible laser beam.

The focus of the $CO_2$ laser is then determined by burning a pattern in a specimen block of Lucite at the focal point 112.

The above procedure sets out the apparatus and method for an improved mounting arrangement for a right angle Cassegranian telescope.

It is to be understood that the foregoing description is merely illustrative of the preferred embodiment of the invention and that the scope of the invention is not to be limited thereto, but is to be determined by the scope of the appended claims.

What is claimed is:

1. An optical system for directing a beam of corpuscular energy comprising a housing defining a central, longitudinal axis, said housing defining a side opening adapted for receiving a beam of corpuscular energy which is directed from a direction substantially perpendicular to said central, longitudinal axis, a first mirror fixedly mounted in said housing at a position to receive a beam directed in said direction, said first mirror being mounted at an angle to said central, longitudinal axis so that the beam is directed substantially in an axial direction, a concave second mirror fixedly mounted in said housing on said central, longitudinal axis and spaced from said first mirror so as to receive a reflected beam and reflect it back to impinge upon a third mirror, said third mirror also being positioned on said central, longitudinal axis, and means movably mounting said third mirror in three directions being said longitudinal (X) axis direction, said (Y) axis direction substantially perpendicular to said longitudinal axis, and a (Z) axis direction substantially perpendicular to a place defined by said longitudinal axis and said direction substantially perpendicular to said longitudinal axis, further including a centrally located bore in said first mirror, and wherein said means movably mounting said third mirror comprises a generally cylindrical mirror mount member supported by a pair of circumscribing eccentric annular members, said pair of members being of different size whereby a first inner annular member fits within a second outer annular member, and wherein said outer annular member fits within said bore, said annular members being dimensioned with respect to each other so that relative rotation of said inner and outer members causes motion in two directions, being the Y and Z axis directions whereby the position of said third mirror about said central, longitudinal axis may be adjusted.

2. The system of claim 1 wherein said annular members include radially directed flanges extending from an end thereof directed away from said third mirror, the flange on said outer annular member abutting said first mirror mount, the flange on said inner member abutting said flange on said outer member, a radially directed cylinder flange on the end of said cylindrical mirror mount on the end thereof adjacent to said annular member flanges, and further including adjustment means fitting between and spacing said cylinder flange and said inner member flange whereby the axial positioning of said third mirror may be changed, so as to permit movement of said third mirror along said axis, thereby changing its spacing in relation to said second mirror.

3. The system of claim 2 wherein said adjustment means comprise at least one shim member.

4. The system of claim 3 wherein each said shim member comprises a pair of half rings.

5. The system of claim 1 further including locking means for securing said means movably mounting said third mirror so as to lock said last named means in a desired position.

* * * * *